March 29, 1955  A. Y. DALZIEL ET AL  2,704,867
DRAUGHT EXCLUDERS OR EDGE TRIMMING
Filed March 15, 1950  2 Sheets-Sheet 1

Inventors
ALEXANDER YOUNG DALZIEL
DAVID McLEAN

Cushman, Darby & Cushman
Attorneys

March 29, 1955   A. Y. DALZIEL ET AL   2,704,867
DRAUGHT EXCLUDERS OR EDGE TRIMMING
Filed March 15, 1950   2 Sheets-Sheet 2

Inventors
ALEXANDER YOUNG DALZIEL
DAVID McLEAN

Cushman, Darby & Cushman
Attorneys

000
United States Patent Office 2,704,867
Patented Mar. 29, 1955

2,704,867

DRAUGHT EXCLUDERS OR EDGE TRIMMING

Alexander Young Dalziel and David McLean, Coventry, England, assignors to Imperial Chemical Industries Limited, a corporation of Great Britain Application March 15, 1950, Serial No. 149,798

Claims priority, application Great Britain March 29, 1949

8 Claims. (Cl. 20—69)

The present invention comprises improvements in or relating to draught excluders or edge trimming for example for application to doors or door surrounds or to furniture or to any article formed with free edges to which it is desired to apply a decorative and/or protective trimming or beading. It is an object of the invention to provide a draught excluder or edge trimming which is readily fabricated and/or readily applied and secured in position for use.

It has already been proposed to provide draught excluders and rattle preventing means for doors or windows, more especially of motor vehicles, wherein a U-section rubber strip has bonded within it a channel shaped metal insert for engaging and embracing a flange or edge of a part to which the draught excluder is to be applied. The metal insert has also been slotted transversely to afford flexibility and to facilitate bonding to the rubber.

According to the present invention a draught excluder or edge trimming comprises a strip of fabric, rubber or like flexible and deformable material and one or more gripping elements having arms to embrace and engage a flange or edge of a part to which the draught excluder or trimming is to be applied and having a part or parts mechanically interengaging and supporting the strip of fabric, rubber or the like. The mechanical engagement of the gripping element or elements and the strip of fabric, rubber or the like will be understood to be one secured by appropriate formation of the parts without the necessity for effecting a bonding of the element or elements to a rubber strip.

The gripping element or elements are preferably of metal and may be formed to afford a press fit when embracing and engaging the flange or edge to which they are applied, or the gripping element or elements may be formed as spring clips resiliently engaging the said flange or edge. Preferably a plurality of gripping elements are provided in spaced relation along the length of the strip of fabric or the like.

Conveniently the gripping element or elements engaging the flanges or edge are such as to engage and secure one or both free edges of the strip of fabric, rubber or the like, and in one form of the invention the said elements are provided in pairs secured to opposite edges of the strip with one element of each pair capable of interfitting within the other element of the pair which are applied to the flange or edge in such interfitted relationship.

One form of gripping element is of spring steel with parts to engage the flange or edge and/or another interfitting element, for example such a clip may afford slightly deformed resilient barbs which may be stamped out from the side walls of the element, for engaging and gripping the flange or edge to which the element is applied. In the case where pairs of such interfitting elements are employed the barbs of the outer element are then disposed to engage the barb apertures on the walls of the inner element.

In another and preferred form of the invention the gripping element is of spring steel with a pair of oppositely located barbs stamped out of the side walls at each end of the gripping element, these barbs serving to hold opposite edges of the strip and at the same time to grip the flange or edge to which it has to be fitted.

Various embodiments of the invention will now be described by way of example with reference to the accompanying drawings in which.

Figure 1:
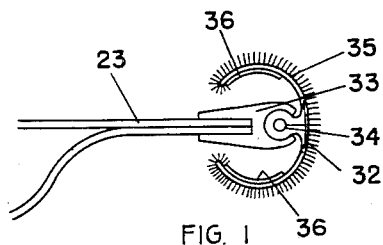
Figures 1 to 7 are cross sectional views of various forms of trimming constructed in accordance with the invention shown as applied to an edge or flange of a steel panel of a motor vehicle body.

Figure 1 shows a form of trimming with spaced metal (e. g. aluminium) clips 33 which are formed to be a press fit on the flange 23, representing, for example, the edge of steel panelling for a motor vehicle body, and which have arms to engage a cord or wire cord 34 covered by the base fabric 32 provided with an outer covering 35 formed at the free edges of the trimming with turned in selvedge portions 36. The base fabric 32 is conveniently of double thickness as shown and may be of material which has been rubberised or otherwise strengthened, while the outer covering 35 is conveniently secured thereto by adhesive and the metal clips are threaded endwise on to the core 34. A length of the trimming or draught excluder is shaped to conform to the edge of the panel to which it is applied, e. g. to the shape of a door or door opening in a vehicle body and lengths of the trimming may abut one another at their ends.

Figure 2:
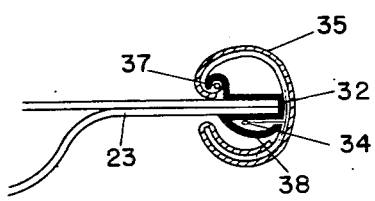
Figure 3:
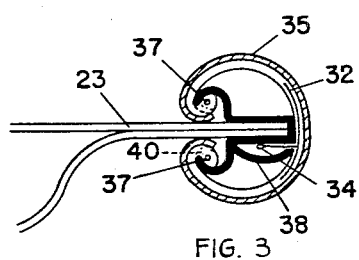
Figure 3A:
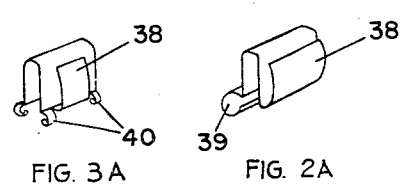
Figures 2A, 3A, 4A, 5A and 6A are perspective views of gripping elements employed in the forms of the invention shown in Figures 2, 3, 4, 5 and 6 respectively.
Figure 2A:
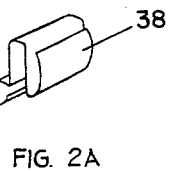

An arrangement is shown in Figure 2 with spaced metal clips of the form shown in Figure 2A employed to engage the flange 23 as a press fit. The clips have lateral flanges 38 to enclose a core 34 covered by the base fabric 32 formed in a double layer to carry the covering material 35. The core 34 is now off centre from the crown of the trimming while a wire 37 is enclosed in the base fabric 32 at one edge to be looped in and engaged and secured by the hooked flanges 39 of the clips. The trimming in this case fits snugly adjacent the edge of the flange 23. A further modification is shown in Figure 3 in which a metal clip of the form shown in Figure 3A is employed and wire 37 is included longitudinally within the edges of the fabric of the trimming. The metal clip has prongs 40 which are clenched through the base fabric 32 round the wire 37 of the wired edges.

Figure 4:
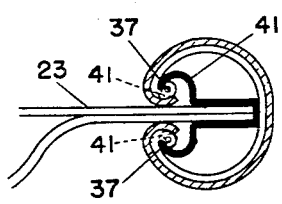
Figure 5:
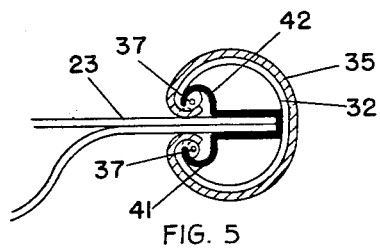
Figure 4A:
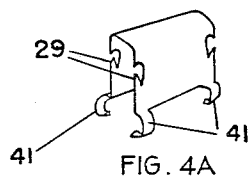

In the arrangement shown in Figure 4 a spring steel clip of the form shown in Figure 4A is employed. The clip has lugs 41 which are clenched round wired edges 37 of the trimming as described in connection with Figure 3. Inwardly deformed resilient barbs 29 are stamped from the side walls of the clip to retain the latter on the flange 23. In Figure 5 the spring clip (shown in Figure 5A) has lugs 41 clenched to a wire 37 of one wired edge of the trimming consisting of covering material 35 on a base fabric 32, and the clip has a channel 42 for receiving the other wired edge of the fabric so that final assembly of the trimming prior to fitting is rendered more easy.

Figure 6:
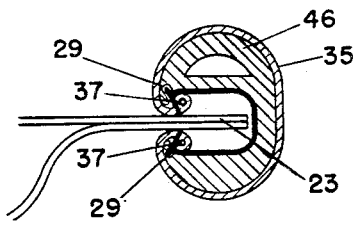
Figure 6A:
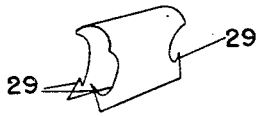

Yet a further form of spring steel clip is shown in Figure 6A as having two pairs of barbs 29 which barbs are of the form described as in relation to Figure 4 and form opposed pairs located at the extreme ends of each side. In use the barbs 29 serve to grip the edge of flange 23 to be trimmed and are utilised at the same time as a means for mechanically engaging and retaining a rubber or like moulding or extruded core 46 and an outer covering 35. As shown more clearly in Figure 6, the inner side of the free edges of the moulding 46 have recesses which receive and fit along the outwardly flared side edges of the clip, and the edges of the outer covering 35 which are stitched or otherwise attached to wire reinforcements 37 pass over and round the side edges of the clip and are pierced by the barbs 29 so that the wire reinforcements carrying the edges of the outer cover 35 slip down on the outer sides of the barbs 29, thus maintaining the core 46 and the covering 35 tightly in position while leaving the barbs 29 free to engage the flange 23.

Figure 7:
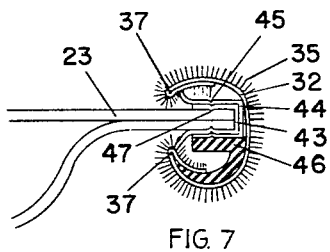

The forms of trimming shown in Figures 6 and 7 represent continuous edge trims of a flexible nature which can be push fitted over the end thickness of metal flanges or panels and which are thereafter firmly held in position without further attention. The flexible trimmings shown by way of example in the drawings are described in relation to their use as a seal on the metal flanges forming the apertures, such as door and window apertures, in steel automobile bodies or on metal flanges of closure panels for said apertures.

Figure 8:
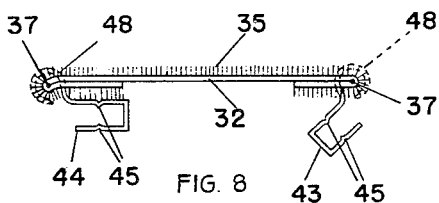
Figure 8 is a cross section of the trimming shown in Figure 7 prior to final assembly.
Figure 9:
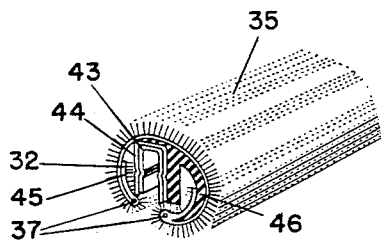
Figure 9 is an end perspective view of the finally assembled trimming of Figure 8.

In the form of trimming shown in Figures 7 to 9, a flexible base material 32 of fabric, rubber, plastic or the like initially of strip or ribbon form, as seen more clearly from Figure 8, has its free edges folded over to enclose a reinforcing beading of wire, cord or the like 37 at the edges of the material 32. The folded portions of the latter material may be secured together by any preferred means e. g., by the use of adhesive such as rubber solution or by stitching. A covering 35 is applied to the base 32 and may be lace, cut moquette, leathercloth, plastic sheet or the like to suit in use a surrounding colour scheme. The covering 35 may be secured to the base 32 by adhesive or by stitching and/or may be flock or paint sprayed. Preferably, however, the covering 35 is extended laterally so as also to enclose the beading 37 at its inner edge.

Spring steel clips are secured at spaced intervals along the edges of the covered base 32, such clips being formed in pairs as male and female members capable of being fitted one within the other. As shown in Figures 7, 8 and 9 male clip 43 and female clip 44 have interfitting ridges 45 which interengage when the clips are fitted one within the other to the position shown in Figure 9. The trimming shown in the latter figure is similar to that shown in Figure 6 in that it includes a rubber moulding 46 for imparting a desired degree of rigidity and resilience to the trimming, the mouldings 46 of Figures 6 and 9 being, however, of different cross section. The trimming as seen in Figure 9, is in a form as supplied to a user for application to a metal flange. As fitted in position on a flange, seen in cross section in Figure 7, grooves or scorings 47 are made on the metal flange 23 for engagement also by the ridges 45 of the male clip 43. By this means the trimming is firmly secured in position.

Figure 5A:
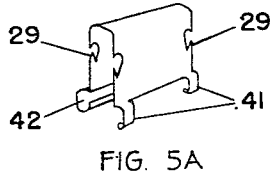

The spring steel clips 43 and 44, as in the case of those shown in Figures 4A, 5A and 6A, may be about ½" in length and spaced up to 2½" apart for an automobile door seal. They may be provided at one edge with tongues or staples similar to those shown at 41 in Figures 4A and 5A. These tongues are employed for stapling the clips to the trimming by passage of the tongues through the base material 32 inwardly of the wires 37 and by subsequent deformation of the tongues round the wire or beadings 37 to embrace the latter. Such formation of the tongues is shown in chain lines at 48 in Figure 8. The clips may be secured at the edges of the base 32 either before or after the covering 35 has been applied. The clips 43 and 44 are also secured at the edges of the trimming while the latter is in ribbon form as shown in Figure 8 and preferably in a relative disposition to the trimming also shown in the figure so as to facilitate deformation to the assembled position shown in Figures 7 and 9 with the insertion of the rubber moulding 46.

In place of the ridges 45 shown in Figures 7, 8 and 9 the clips may be provided with barbs similar to those shown at 29 in Figures 4A, 5A and 6A. In such case the male clip, when pressed on to a metal flange grips the latter on attempted removal without necessarily any special formation of the flange being required, while the female clip has barbs dimensioned to engage the edges of the pressed out portions of the side walls of the male clip adjacent the barbs thereof when the pairs of male and female clips are interfitted. In all cases of the use of clips with spring barbs no special formation of the flange for the retention of the clips is necessary, but it is to be understood also that any appropriate scoring or recess or recesses on the parent metal flange may be employed, if desired, as an aid in retaining the metal clips with or without barbs on the flange, clips being then dimensioned to engage such recesses. If so desired a shaped section or beading may be fitted to the metal flange or the latter itself shaped to inter-engage with suitably formed spring clips which remain an integral part of the trimming while providing a gripping anchorage.

In the case of the clip as shown at Figure 6A the barbs engage the two edges of the trimming or covering so that the reinforcing wire 37 is located behind the barb 29. The covering and the clip therefore form a complete unit which can be attached to a flange or other raw edge with the minimum difficulty.

Figure 10:
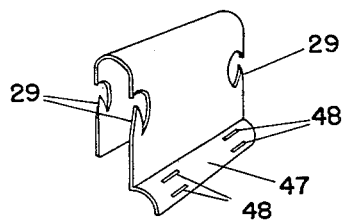
Figures 10, 11 and 12 are perspective views of modified forms of spring clip which may be employed.
Figure 11:
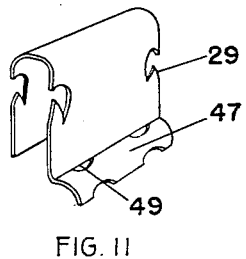
Figure 12:
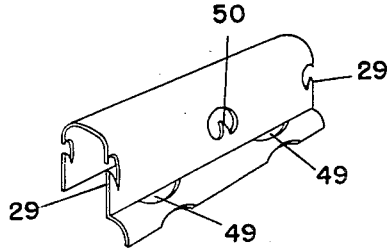
Figure 13:
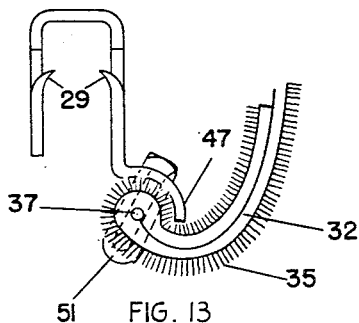
Figures 13 and 14 are fragmentary cross sectional and perspective views respectively of such clips secured to one edge of the trimming.
Figure 14:
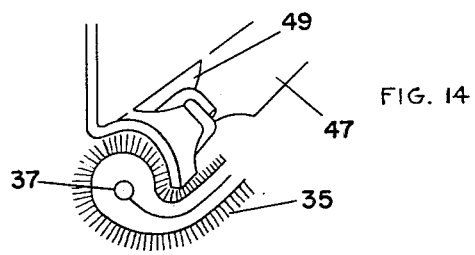

A still further alternative form of spring clip is shown in Figure 10 as having a flange 47 in place of the staple arms 41 of the clip shown in Figure 4A. The flange 47 is apertured as at 48 by means of any suitably shaped holes for receiving a two-pronged wire staple by means of which the clip may be secured to the trimming. Modified forms of aperture 49 are shown in the clip of Figure 11 and again in the form of clip shown in Figure 12 which is intended to receive a metal flange of shallow dimensions and which is shown with additional centre barbs 50 as well as the end barbs 29. A staple 51 is shown, partly in chain lines, in Figure 13 as enclosing the edge reinforcement 37 and with legs of the staple passed through the apertures in the flange 47 and bent over to retain the flange 47 and clip. The deformed ends of the legs of the staple 51 are best seen in the perspective view of Figure 14.

All of the modified forms of clip shown may be formed, as an alternative to the barbs 29, with inter-engaging ridges, embossments or with an enlarged suitably shaped closed end for engaging the flange to which they are applied and, if desired, for engaging one another in pairs. Holes in a flange 47 of a clip may also be pierced without removing metal so that a ragged edge of metal is thrown up round the holes to act as a further grip on the legs of the staple 51.

What we claim is:

1. Edge trimming for application to a free edge of a panel-like part comprising: a flexible strip adapted to cover the edge of the part and having a plurality of spaced resilient clips fastened thereto along the length thereof, each of said clips being channel-shaped for embracing and gripping the edge of the panel-like part and having at least one longitudinal edge thereof secured to the corresponding edge of the strip by mechanical means piercing said strip.

2. The structure defined in claim 1 in which each clip is provided with at least one barb for engaging a side of the panel-like part to retain the said clip, and the strip, thereon.

3. The structure defined in claim 1 in which at least one edge of the strip has a longitudinal reinforcement and the clips are secured thereto.

4. Edge trimming for application to a free edge of a panel-like part comprising: a flexible strip adapted to cover the edge of the part and having a plurality of spaced channel-shaped clips secured thereto along the length thereof, said clips being adapted to embrace the edge of the panel-like part and having inwardly directed barbs for engaging the sides of the part, and said strip having its longitudinal side edges folded into the channels of said clips and impaled on said barbs.

5. Edge trimming for application to a free edge of a panel-like part comprising: a flexible strip adapted to cover the edge of the part and having a plurality of spaced pairs of interfitting channel-shaped clips secured thereto along the length thereof, the inner clip of each pair being adapted to embrace the edge of the panel-like part, one longitudinal side edge of said strip being secured to a longitudinal edge of one clip of each pair and the other side edge of said strip being secured to the opposite longitudinal edge of the other clip of each pair.

6. The structure defined in claim 5 in which both the inner and the outer clip of each pair have inwardly directed barbs, the barbs on the inner clip being adapted to engage the sides of the part and the barbs on the outer clip being adapted to engage the sides of the inner clip.

7. Edge trimming for application to a free edge of a panel-like part comprising: a flexible strip adapted to cover the edge of the part and having wire reinforced beaded longitudinal edges; and a plurality of spaced channel-shaped clips adapted to embrace the edge of the panel-like part secured to said strip along the length thereof, each of said clips having prongs along at least one of its longitudinal edges clenched around the corresponding beaded edge of said strip.

8. Edge trimming for application to a free edge of a panel-like part comprising: a flexible deformable strip adapted to cover the edge of the part and having a plurality of spaced channel-shaped clips secured thereto by strip-piercing means along the length thereof, said clips being adapted to embrace the edge of the part and having inwardly directed barbs for engaging the sides of the part to retain said clips, and said strip, thereon.

References Cited in the file of this patent

UNITED STATES PATENTS

| | | |
|---|---|---|
| 2,197,332 | Bailey | Apr. 16, 1940 |
| 2,216,219 | Wiley | Oct. 1, 1940 |
| 2,554,452 | Bright | May 22, 1951 |

FOREIGN PATENTS

| | | |
|---|---|---|
| 631,890 | Great Britain | Nov. 11, 1949 |